United States Patent
Sayers

(10) Patent No.: US 9,677,737 B1
(45) Date of Patent: Jun. 13, 2017

(54) DUAL LENS STRUCTURE FOR LIGHT FIXTURES

(71) Applicant: Wilston Nigel Christopher Sayers, Atlanta, GA (US)

(72) Inventor: Wilston Nigel Christopher Sayers, Atlanta, GA (US)

(73) Assignee: Cooper Technologies Company, Houston, TX (US)

( * ) Notice: Subject to any disclaimer, the term of this patent is extended or adjusted under 35 U.S.C. 154(b) by 1044 days.

(21) Appl. No.: 13/863,175

(22) Filed: Apr. 15, 2013

(51) Int. Cl.
*F21V 5/04* (2006.01)

(52) U.S. Cl.
CPC ............... *F21V 5/04* (2013.01); *F21V 5/045* (2013.01)

(58) Field of Classification Search
CPC ....... F21V 5/04; F21V 5/045; G02B 6/12004; G02B 6/4212; G02B 6/43; H03F 3/08
See application file for complete search history.

(56) References Cited

U.S. PATENT DOCUMENTS

| | | | |
|---|---|---|---|
| 4,577,260 A * | 3/1986 | Tysoe | F21S 48/2212 362/268 |
| 9,080,739 B1 * | 7/2015 | Sayers | F21V 5/00 |
| 2005/0122711 A1 * | 6/2005 | Matthews | F21L 4/027 362/184 |

* cited by examiner

*Primary Examiner* — Stephen F Husar
(74) *Attorney, Agent, or Firm* — King & Spalding LLP

(57) ABSTRACT

A dual lens structure includes an outer elongated lens segment that has a substantially dome-shaped cross-section. The outer elongated lens segment includes a first optical pattern. The dual lens structure also includes inner elongated lens segment that has a substantially bell-shaped cross-section. The inner elongated lens segment includes a second optical pattern and is at least partially positioned within the outer elongated lens segment. The dual lens structure further includes a first segment coupled to a first longitudinal side of the outer elongated lens segment and to a first longitudinal side of the inner elongated lens segment. The dual lens structure also includes a second segment coupled to a second longitudinal side of the outer elongated lens segment and to a second longitudinal side of the inner elongated lens segment.

20 Claims, 7 Drawing Sheets

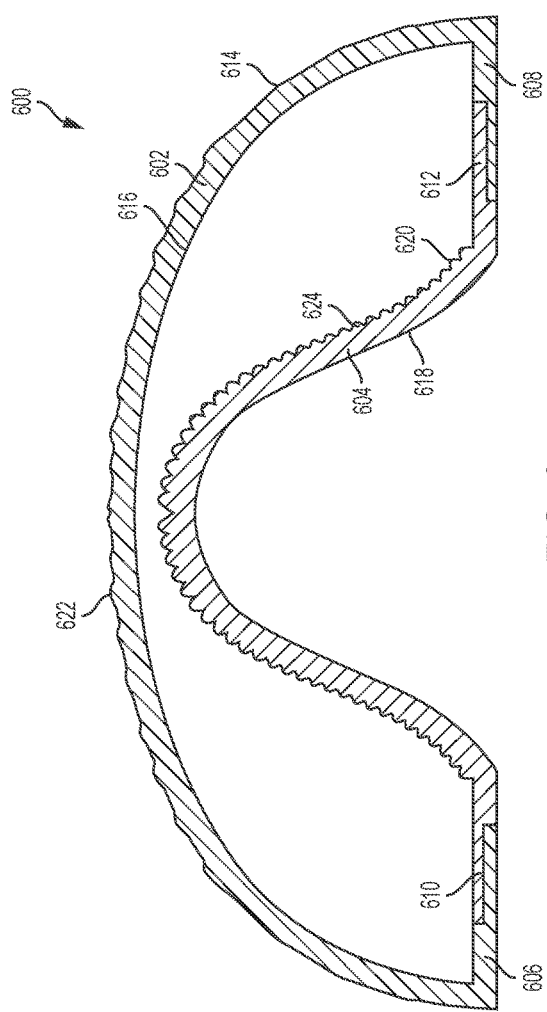

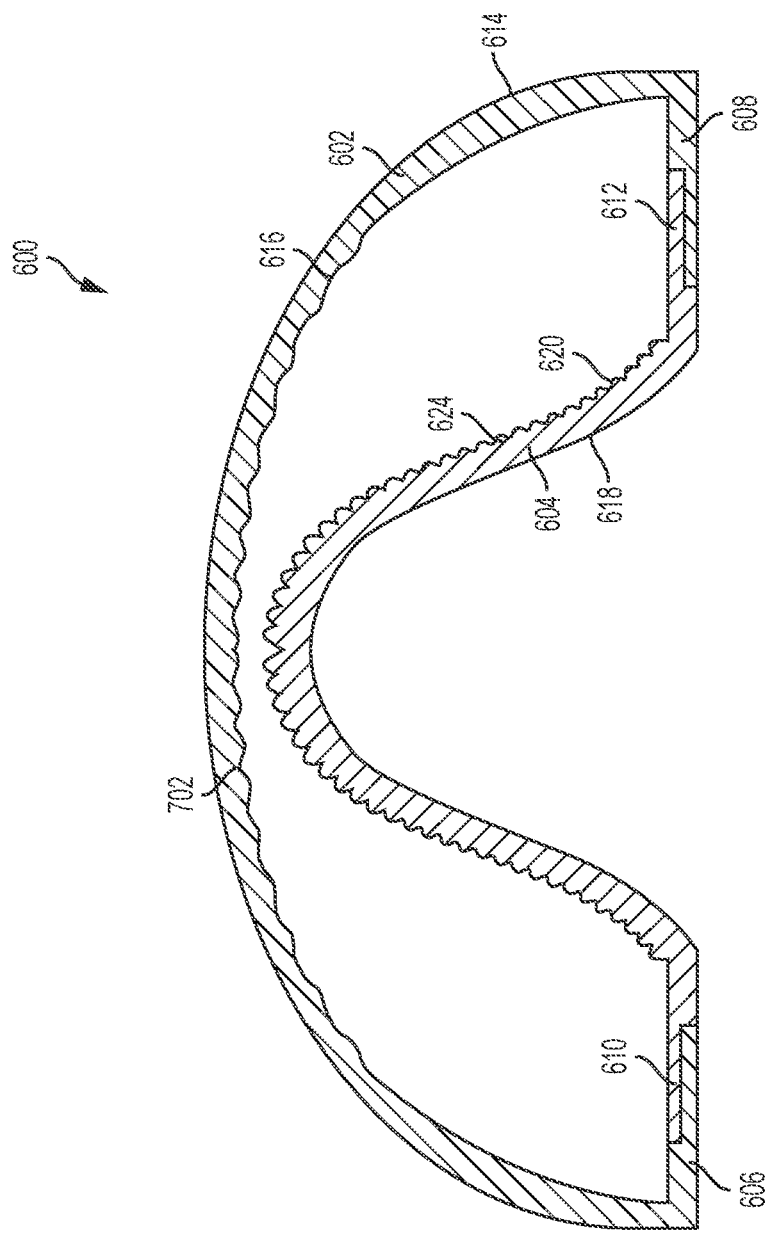

DUAL LENS STRUCTURE FOR LIGHT FIXTURES

TECHNICAL FIELD

The present disclosure relates generally to light fixture lenses, in particular to a dual lens structure for light fixtures.

BACKGROUND

A light fixture may have fluorescent lamps or linear light emitting diodes (LEDs) as a light source. Typically, light distribution from light fixtures that use fluorescent lamps or linear LED arrays is limited by the geometry of the light fixture. For example, in an uplight fixture, louvers may be used to shape light from a light source of the fixture upwards. As another example, illumination of an area by a light fixture may be limited by a shape of a lens that surrounds a light source of the light fixture. The limitation on illumination by a light source may result in a need for additional light fixtures to illuminate an area. For example, light fixtures may need to be placed close to each other in order to provide a desired level of illumination, which in turn may result in the need for more light fixtures to adequately illuminate a particular area such as a hallway. The need for more light fixtures to provide a desired level of illumination may result in the increased cost of additional fixtures as well as higher installation and usage expenses.

Thus, a lens structure that provides improved illumination by a light fixture may enable a sparse placement of light fixtures and thereby reducing the cost of providing a desired level of illumination by using fewer light fixtures.

BRIEF DESCRIPTION OF THE DRAWINGS

Reference will now be made to the accompanying figures, which are not necessarily to scale, and wherein:

FIG. 6 illustrates a cross-sectional view of a dual lens structure according to another example embodiment; and FIG. 7 illustrates a cross-sectional view of a dual lens structure according to another example embodiment.

Figure 1:
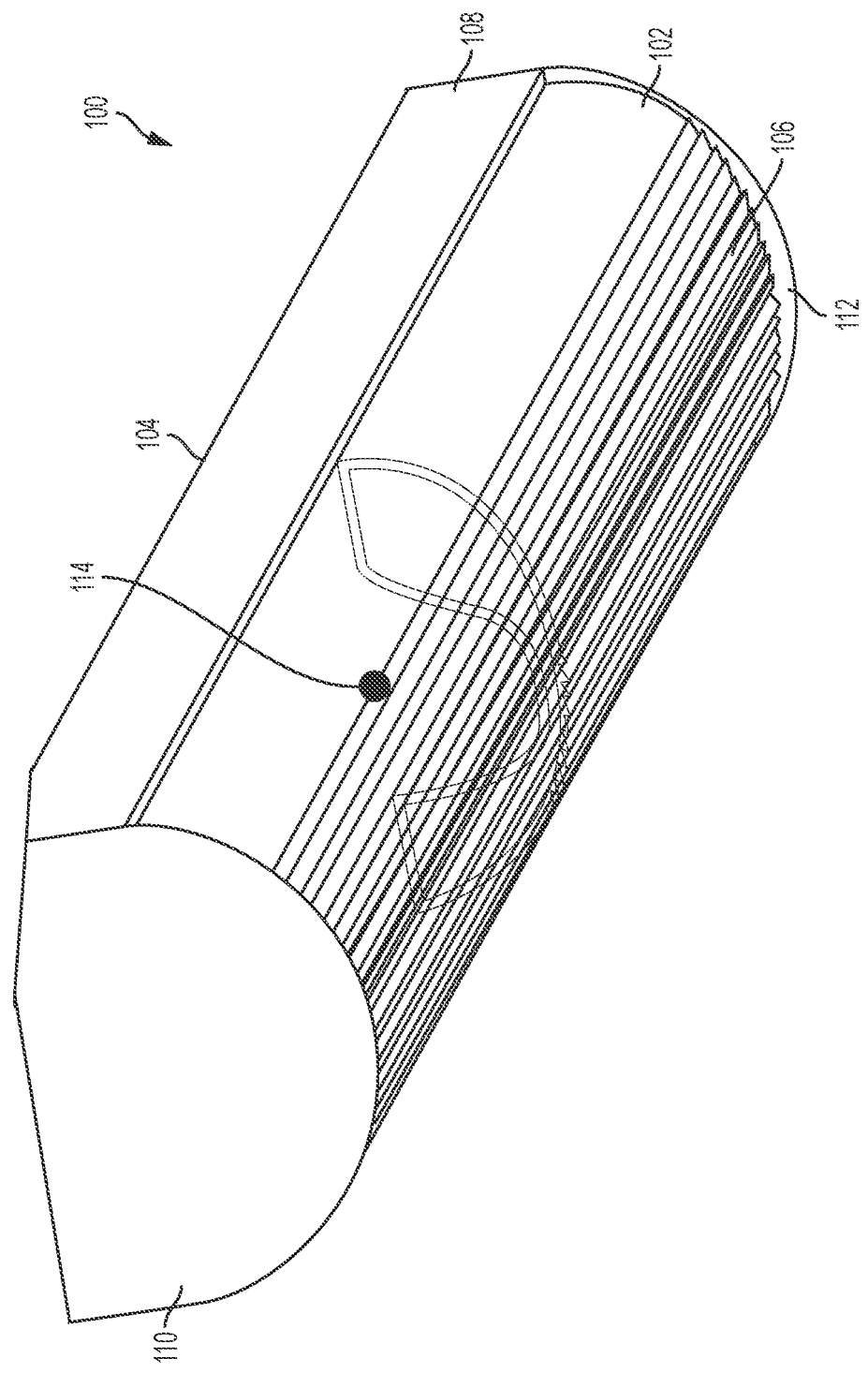
FIG. 1 illustrates a light fixture including a dual lens structure according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the figures, reference numerals designate like or corresponding, but not necessarily identical, elements.

SUMMARY

The present disclosure relates to a dual lens structure for light fixtures. In an example embodiment, a dual lens structure includes an outer elongated lens segment that has a substantially dome-shaped cross-section. The outer elongated lens segment includes a first optical pattern. The dual lens structure also includes inner elongated lens segment that has a substantially bell-shaped cross-section. The inner elongated lens segment includes a second optical pattern. The inner elongated lens segment is at least partially positioned within the outer elongated lens segment. The dual lens structure further includes a first segment coupled to a first longitudinal side of the outer elongated lens segment and to a first longitudinal side of the inner elongated lens segment. The dual lens structure also includes a second segment coupled to a second longitudinal side of the outer elongated lens segment and to a second longitudinal side of the inner elongated lens segment. The outer elongated lens segment, the inner elongated lens segment, the first segment, and the second segment are integrally formed.

In another example embodiment, a dual extruded lens includes an outer elongated lens that includes a first lens segment, a first flange, and a second flange. The first lens segment has a substantially dome-shaped cross-section and includes a first optical pattern. The first flange and the second flange extend out from opposite sides of the first lens segment. The dual extruded lens also includes an inner elongated lens that includes a second lens segment, a third flange, and a fourth flange. The second lens segment has a substantially bell-shaped cross-section and includes a second optical pattern. The third flange and the fourth flange extend out from opposite sides of the second lens segment. The second lens segment is at least partially positioned within the first lens segment. The third flange is coupled to the first flange. The fourth flange is coupled to the second flange.

In another example embodiment, a light fixture includes a light source and a dual lens structure. The dual lens structure includes an outer elongated lens that includes a first lens segment that has a substantially dome-shaped cross-section. The first lens segment includes a first optical pattern. The dual lens structure also includes an inner elongated lens that includes a second lens segment that has a substantially bell-shaped cross-section. The second lens segment includes a second optical pattern. The second lens segment is positioned at least partially within the outer elongated lens segment. The light source is positioned in the light fixture to direct light towards the second lens segment.

These and other aspects, objects, features, and embodiments will be apparent from the following description and the appended claims.

DETAILED DESCRIPTION OF THE EXAMPLE EMBODIMENTS

In the following paragraphs, example embodiments will be described in further detail with reference to the drawings. In the description, well known components, methods, and/or processing techniques are omitted or briefly described. Furthermore, reference to various feature(s) of the embodiments is not to suggest that all embodiments must include the referenced feature(s).

Turning now to the drawings, particular embodiments are described. FIG. 1 illustrates a light fixture including a dual lens structure according to an example embodiment. The light fixture 100 is operable to illuminate a space around the light fixture 100. The light fixture 100 includes a dual lens structure 102 and a fixture housing 104. The dual lens structure 102 includes an outer lens and an inner lens as described below. Each of the outer lens and the inner lens may have a corresponding optical pattern. For example, the outer lens may have an optical pattern 106. In an example embodiment, the optical pattern 106 may be a saw tooth pattern. As illustrated in FIG. 1, the dual lens structure 102 may be attached to the fixture housing 104. For example, the dual lens structure 102 may be attached to the fixture by one or more fasteners. FIG. 1 shows an illustrative cross-section of the dual lens structure 102 that is described below with respect to FIG. 2.

In an example embodiment, the fixture housing 104 includes a side panel 108 on each side of the light fixture 100, a first end panel 110, and a second end panel 112. The first end panel 110 is attached to each side panel 108 at a first end of the light fixture 100. The second end panel 112 is attached to each side panel 108 at a second end of the light fixture 100 opposite the first end. In an example embodiment, the first end panel 110 and the second end panel 112 may serve to enclose the dual lens structure 102 at the opposite ends of the dual lens structure 102.

In an example embodiment, the light fixture 100 includes a light source 114 that is positioned to direct light towards the dual lens structure 102 such that the light fixture 100 illuminates a space around the light fixture 100. For example, the light source 114 may extend substantially the entire length of the dual lens structure 102. In alternative embodiments, the light source 114 may extend for less than the entire length of the dual lens structure 102. In some example embodiments, the light source 114 may include one or more light emitting diodes (LEDs) such as a light emitting diode (LED) array that includes, for example, a chip on board. A driver, such as an LED driver, that provides power to the light source 114 may be disposed within the fixture housing 104.

Although optical pattern 106 is shown on the outside surface of the outer lens of the dual lens structure 102, in alternative embodiments, the optical pattern 106 may be on an inside surface of the outer lens as described below. Further, the optical pattern 106 may be different than shown in FIG. 1. Further, although the light fixture 100 is shown as a downlight that may be attached to a structure such as a ceiling, in alternative embodiments, the light fixture 100 may be a different type of light fixture including a recessed light fixture. Alternatively, the light fixture 100 may also be an uplight configured to emit light primarily upwards relative to a position of the light fixture 100.

Figure 2:
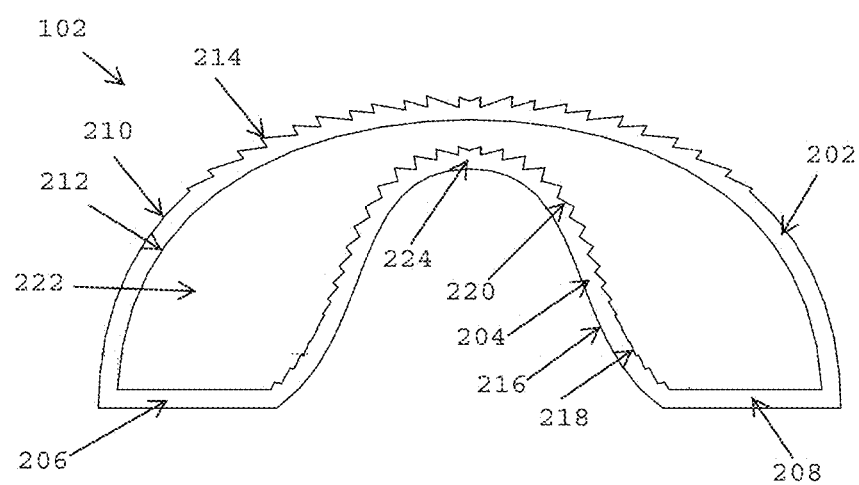
FIG. 2 illustrates a cross-sectional view of a dual lens structure according to an example embodiment.

FIG. 2 illustrates a cross-sectional view of a dual lens structure 102 of FIG. 1 according to an example embodiment. The dual lens structure 102 includes an outer elongated lens segment 202, an inner elongated lens segment 204, a segment 206 and another segment 208. In an example embodiment, the outer elongated lens segment 202 may extend longitudinally between the first end panel 110 and the second end panel 112 of the fixture housing 104 of FIG. 1.

The outer elongated lens segment 202 has a substantially dome-shaped cross-section as illustrated in FIG. 2. The outer elongated lens segment 202 has a surface 210 and another surface 212 opposite the surface 210. The outer elongated lens segment 202 may include an optical pattern 214 on the surface 210. The optical pattern 214 is configured to increase light intensity in the distribution from a light source such as the light source 114 of FIG. 1. The optical pattern 214 may be only on a portion of the surface 210 as illustrated in FIG. 2. Alternatively, the optical pattern 214 may be on substantially the entire surface 210. In an example embodiment, the optical pattern 214 is a saw tooth pattern. In an example embodiment, the outer elongated lens segment 202 is a Fresnel lens.

In an example embodiment, the inner elongated lens segment 204 has a substantially bell-shaped cross-section as illustrated in FIG. 2. The inner elongated lens segment 204 may extend longitudinally between the first end panel 110 and the second end panel 112 of the fixture housing 104 of FIG. 1. For example, the inner elongated lens segment 204 may have substantially the same length as the outer elongated lens segment 202. Alternatively, the inner elongated lens segment 204 may be shorter or longer than the outer elongated lens segment 202.

The inner elongated lens segment 204 has a surface 216 and another surface 218 opposite the surface 216. The inner elongated lens segment 204 includes an optical pattern 220 that is on the surface 218. The optical pattern 220 is configured to increase light distribution from a light source such as the light source 114 of FIG. 1. In an example embodiment, the optical pattern 220 is a saw tooth pattern. As illustrated in FIG. 2, the optical pattern 220 may cover the entire surface 218. Alternatively, the optical pattern 220 may be on less than the entire surface 218. In an example embodiment, the inner elongated lens segment 204 is a Fresnel lens.

In an example embodiment, the inner elongated lens segment 204 is at least partially positioned within the outer elongated lens segment 202. As illustrated in FIG. 2, the inner elongated lens segment 204 may be substantially entirely within the outer elongated lens segment 202. In alternative embodiments, only a portion of the inner elongated lens segment 204 including the apex 224 of the inner elongated lens segment 204 may be positioned within the outer elongated lens segment 202.

In an example embodiment, the segment 206 is coupled to a longitudinal side of the outer elongated lens segment 202 and to a longitudinal side of the inner elongated lens segment 204. As illustrated in FIG. 2, the segment 206 may extend between a lower end portion of the outer elongated lens segment 202 and a lower end portion of the inner elongated lens segment 204 on one side of the dual lens structure 102. Similarly, the second segment 208 is coupled to the second longitudinal side of the outer elongated lens segment 202 and to the second longitudinal side of the inner elongated lens segment 204. The segment 208 may extend between a lower end portion of the outer elongated lens segment 202 and a lower end portion of the inner elongated lens segment 204 on another side of the dual lens structure 102. Each of the segment 206 and the segment 208 may extend longitudinally for the entire length of the dual lens structure 102. Alternatively, one or both of the segment 206 and the segment 208 may extend longitudinally for less than the entire length of the dual lens structure 102.

In an example embodiment, the outer elongated lens segment 202, the inner elongated lens segment 204, the first segment 206, and the second segment 208 are integrally formed. For example, the dual lens structure 102 may be made by extruding the outer elongated lens segment 202, the inner elongated lens segment 204, the first segment 206, and the second segment 208 as a single piece. To illustrate, the outer elongated lens segment 202, the inner elongated lens segment 204, the first segment 206, and the second segment 208 may be made from plastic that is be extruded to form the dual lens structure 102 as a single piece. Alternatively, the outer elongated lens segment 202, the inner elongated lens segment 204, the first segment 206, and the second segment 208 may be made from glass.

In an example embodiment, each of the outer elongated lens segment 202, the inner elongated lens segment 204, the first segment 206, and the second segment 208 may be extruded individually. The segment 206 may be attached to the outer elongated lens segment 202 and to the inner elongated lens segment 204 by one or more fasteners on one side of the dual lens structure 102. Similarly, the segment 208 may be attached to the outer elongated lens segment 202 and to the inner elongated lens segment 204 by one or more fasteners on another side of the dual lens structure 102. A fastener such as a screw and glue may be used to fixedly couple the segment 206 and the segment 208 to the outer elongated lens segment 202 and to the inner elongated lens segment 204.

In an example embodiment, the surface 212 of the outer elongated lens segment 202, the surface 218 of the inner elongated lens segment 204, a surface of the segment 206, and a surface of the segment 208 at least partially surround a hollow space 222. The hollow space 222 may be enclosed at the two longitudinal ends of the dual lens structure 102 by end panels, such as the end panels 110 and 112 of the fixture housing 104 of FIG. 1. Alternatively, the hollow space 222 may be enclosed at the two longitudinal ends of the dual lens structure 102 by panels that are part of the dual lens structure 102. In some example embodiments, the hollow space 222 may be filled with a gas other than air. Alternatively, the hollow space 222 may be filled with a liquid.

In an example embodiment, the dual lens structure 102 may be positioned over or under a light source within a light fixture. In particular, the inner elongated lens segment 204 may be positioned above or below a light source such that light from the light source is directed towards the surface 216 of the inner elongated lens segment 204. For example, the inner elongated lens segment 204 may be positioned under the light source 114 of FIG. 1. Light from the light source may pass through the surface 218 of the inner elongated lens segment 202 towards the outer elongated lens segment 202. The light that passes through the inner elongated lens segment 204 may be emitted through the surface 210 of the outer elongated lens segment 202. The combination of the outer elongated lens segment 202 and the inner elongated lens segment 204 along with their corresponding optical pattern 214 and 210 results in improved light distribution as compared to a typical lens.

By using the dual lens structure 102, distribution of light from a light source may be controlled to provide improved illumination of an area. The optical patterns 214 and 220 provide control over the light distribution and enhance illumination while avoiding limitations of light fixture components that may be traditionally used to control the light distribution. Because the dual lens structure 102 may be made from plastic by extrusion, cost of producing a light fixture such as the light fixture 100 may also be reduced relative to a light fixture that uses lenses that are made by other methods.

Although the outer elongated lens segment 202 is shown as having a substantially done-shaped cross-section, in alternative embodiments, the cross-section of the outer elongated lens segment 202 may have a different shape. Similarly, the inner elongated lens segment 204 may have a cross-section that is different from the substantially bell-shaped cross-section shown in FIG. 2. Although the optical pattern 214 and the optical pattern 220 are shown as saw tooth patterns, in alternative embodiments, the optical patterns 214 and 220 may be other patterns and different from each other. Further, although the optical pattern 214 is on the surface 210 of the outer elongated lens segment 202, in alternative embodiments, the optical pattern 214 may be on the surface 212 facing the surface 218 of the inner elongated lens segment 204.

Figure 3:
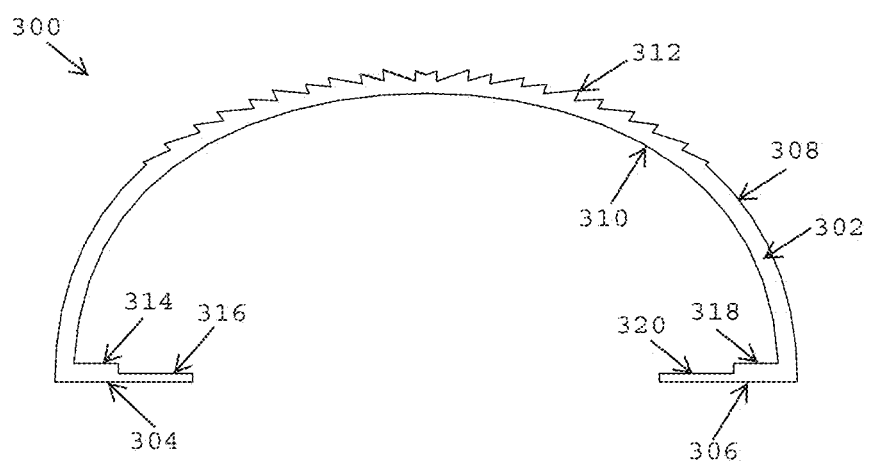
FIG. 3 illustrates a cross-sectional view of an outer lens of a dual lens structure according to an example embodiment.

FIG. 3 illustrates a cross-sectional view of an outer elongated lens 300 of a dual lens structure according to an example embodiment. In an example embodiment, the outer elongated lens 300 along with an inner lens 400 described below with respect to FIG. 4 may be coupled to form a dual lens structure shown in FIGS. 5 and 6.

In an example embodiment, the outer elongated lens 300 may extend longitudinally between the first and second side panels 110 and 112 of the fixture housing 104 of FIG. 1. The outer elongated lens 300 includes a lens segment 302, a flange 304, and a flange 306. The lens segment 302 has a substantially dome-shaped cross-section and includes an optical pattern 312. The lens segment 302 has a surface 308 and another surface 310. The optical pattern 312 may be on the surface 308. The optical pattern 312 is configured to increase light distribution. For example, the optical pattern 312 may be a saw tooth pattern as shown in FIG. 2 or another pattern that increases light distribution. In some example embodiments, the optical pattern 312 may be on the surface 310 instead of on the surface 308. In some example embodiments, the lens segment 302 may correspond to the outer elongated lens segment 202 of FIG. 2.

In an example embodiment, the flange 304 and the flange 306 extend out from opposite sides of the lens segment 302. The flange 304 extends inwards on a longitudinal side of the lens segment 302 towards the flange 306. Similarly, the flange 306 extends inwards on another longitudinal side of the lens segment 302 towards the flange 304. In an example embodiment, the flange 304 includes an elevated segment 314 and a lower segment 316. Similarly, the flange 306 includes an elevated segment 318 and a lower segment 320. The elevated segments 314, 318 and the lower segments 316 and 320 may be designed to receive flanges of an inner lens as described below. In some example embodiments, the flange 304 and the flange 306 may extend longitudinally for the entire length of the lens segment 302. Alternatively, one or both of the flange 304 and the flange 306 may extend for less than the entire length of the lens segment 302.

In an example embodiment, the outer elongated lens 300 may be made from plastic or glass. For example, the outer elongated lens 300 may be made as a single piece by extrusion.

Although FIG. 3 shows the lens segment 302 as having a substantially dome-shaped cross section, in alternative embodiments, the cross section of the lens segment 302 may have another shape. Further, in some alternative embodiments, the flanges 304 and 306 may have a single segment or more than two segments and may also extend out away from each other instead of towards each other.

Figure 4:
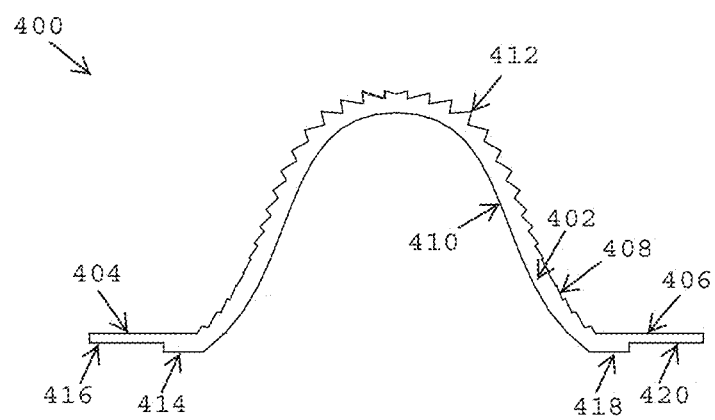
FIG. 4 illustrates a cross-sectional view of an inner lens of a dual lens structure according to an example embodiment.

FIG. 4 illustrates a cross-sectional view of an inner elongated lens 400 of a dual lens structure according to an example embodiment. In an example embodiment, the inner elongated lens 400 is coupled with the outer elongated lens 300 of FIG. 3 to form a dual lens structure. The inner elongated lens 400 includes a lens segment 402, a flange 404, and another flange 406. The lens segment 402 has a substantially bell-shaped cross-section and includes an optical pattern 412. The optical pattern 412 is configured to increase light distribution. For example, the optical pattern 412 may be a saw tooth pattern. As illustrated in FIG. 4, the lens segment 402 may be at least partially positioned within the first lens segment 302 of FIG. 3. In some example embodiments, the lens segment 402 may correspond to the inner elongated lens segment 204 of FIG. 2.

In an example embodiment, the flange 404 and the flange 406 extend out from opposite sides of the lens segment 402. The flange 404 extends outwardly on a longitudinal side of the lens segment 402 away from the flange 406. Similarly, the flange 406 extends outwardly on another longitudinal side of the lens segment 402 away from the flange 404. In an example embodiment, the flange 404 includes a lower segment 414 and an elevated segment 416. Similarly, the flange 406 includes a lower segment 418 and an elevated segment 420. The elevated segment 416 is configured to be positioned on the lower segment 316 of the flange 304 of FIG. 3. Similarly, the elevated segment 420 is configured to be positioned on the lower segment 320 of the flange 306 of FIG. 3. In some example embodiments, the flange 404 and the flange 406 may extend longitudinally for the entire length of the lens segment 402. Alternatively, one or both of the flange 304 and the flange 306 may extend for less than the entire length of the lens segment 302.

In an example embodiment, the inner elongated lens 400 may be coupled to the outer elongated lens 300. To illustrate, the inner elongated lens 400 may be slid in position at a longitudinal end of the outer elongated lens 300. Once the elevated segment 416 of the flange 404 is positioned on the lower segment 316 of the flange 304, and once the elevated segment 420 of the flange 406 is positioned on the lower segment 320 of the flange 306, the inner elongated lens 400 may be fastened to the outer elongated lens 300 by fastening the corresponding flanges using fasteners. Alternatively, one or more clips may be used, for example, at the longitudinal ends of the inner elongated lens 400 and the outer elongated lens 300 to couple the outer elongated lens 300 to the inner elongated lens 400.

Although FIG. 4 shows the lens segment 402 as having a substantially bell-shaped cross section, in alternative embodiments, the cross section of the lens segment 402 may have another shape. Further, in some alternative embodiments, the flanges 404 and 406 may have a single segment or more than two segments.

Figure 5:
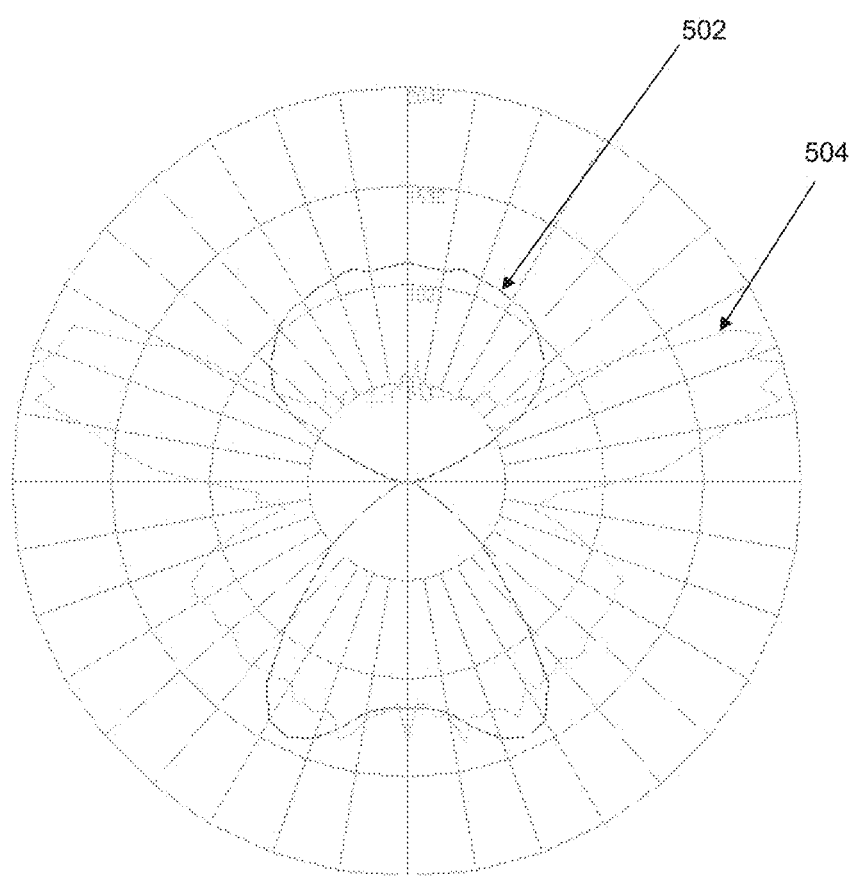
FIG. 5 illustrates an example comparison of photometric intensity plots of a light source with a dual lens structure and a light source with a typical single diffused lens.

FIG. 5 illustrates an example comparison of photometric intensity plots of a light source with a dual lens structure, such as the dual lens structure 102, and a light source with a typical single diffused lens. The curve 502 indicates a luminous intensity of a light source that uses a typical diffused lens. The curve 504 illustrates a luminous intensity of a light source that uses a dual lens structure, such as the dual lens structure 102 of FIGS. 1 and 2. As can be seen in FIG. 5, curve 504 illustrates that the luminous intensity of the light from the light source can be much greater when using the dual lens structure and when using a typical diffused lens. By properly orienting light fixtures that have dual lens structures, fewer light fixtures may be used as compared to the number of light fixtures that use a diffused lens.

FIG. 6 illustrates a cross-sectional view of a dual lens structure 600 according to another example embodiment. The dual lens structure 600 may be used in a light fixture, such as the light fixture 100 of FIG. 1, in manner described above with respect to the dual lens structure 102. The dual lens structure 600 includes a lens segment 602, a flange 606, and a flange 608 that make up an outer elongated lens, such as the outer elongated lens 300 of FIG. 3. The dual lens structure 600 also includes a lens segment 604, a flange 610, and a flange 612 that form an inner elongated lens such as the inner elongated lens 400 of FIG. 4. In an example embodiment, the dual lens structure 600 may be made from plastic or glass.

In an example embodiment, the lens segment 602 includes an optical pattern 622. As illustrated in FIG. 6, the optical pattern 622 is a smooth spline pattern that is different from the saw tooth pattern shown in FIG. 3. The optical pattern 622 is on a surface 614 of the lens segment 602 that faces an area to be illuminated. The lens segment 604 includes an optical pattern 624. As illustrated in FIG. 6, the optical pattern 624 is a smooth spline pattern that is different from the saw tooth pattern shown in FIG. 4. The optical pattern 624 is on a surface 618 of the lens segment 604 that faces a surface 616 of the lens segment 602. In some example embodiments, one or both of the optical pattern 622 and the optical pattern 624 may be a different pattern, such as the saw tooth pattern shown in FIG. 2. Light from a light source may be directed to the surface 620 of the lens segment 604 in a manner described above with respect to FIG. 2.

In an example embodiment, as illustrated in FIG. 6, the flanges 610 and 612 are positioned on the flanges 606 and 608, respectively. The lens segment 602 and the lens segment 604 along with the flanges 606, 608, 610, and 612 at least partially surround a hollow space 626.

FIG. 7 illustrates a cross-sectional view of a dual lens structure 600 according to another example embodiment. The dual lens structure 600 includes the lens segment 602, the flange 606, and the flange 608. The dual lens structure 600 also includes the lens segment 604, the flange 610, and the flange 612. An optical pattern 702 is on the surface 616 of the lens segment 602 facing the surface 618 of the lens segment 604. The optical pattern 624 is on the surface 618. Both the optical pattern 622 and the optical pattern 624 are smooth spline patterns. In alternative embodiments, one or both of the optical pattern 702 and the optical pattern 624 may be a different pattern, such as the saw tooth pattern shown in FIG. 2.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A dual lens structure, comprising:
an outer elongated lens segment having a substantially dome-shaped cross-section, wherein the outer elongated lens segment includes a first optical pattern; and
an inner elongated lens segment having a substantially bell-shaped cross-section, wherein the inner elongated lens segment includes a second optical pattern and wherein a portion of the inner elongated lens segment is positioned within the outer elongated lens segment;
a first segment coupled to and extending horizontally between a first longitudinal side of the outer elongated lens segment and a first longitudinal side of the inner elongated lens segment; and
a second segment coupled to and extending horizontally between a second longitudinal side of the outer elongated lens segment and a second longitudinal side of the inner elongated lens segment, wherein the first segment extends from the first longitudinal side of the outer elongated lens segment in a first direction, wherein the second segment extends from the second longitudinal side of the outer elongated lens segment in a second direction, wherein the first direction and the second direction are opposite directions, and wherein the outer elongated lens segment, the inner elongated lens segment, the first segment, and the second segment are integrally formed.

2. The dual lens structure of claim 1, wherein each of the outer elongated lens segment and the inner elongated lens segment is a Fresnel lens.

3. The dual lens structure of claim 1, wherein the dual lens structure is made by extruding the outer elongated lens segment, the inner elongated lens segment, the first segment, and the second segment.

4. The dual lens structure of claim 1, wherein a surface of the outer elongated lens segment, a surface of the inner elongated lens segment, a surface of the first segment, and a surface of the second segment at least partially surround a hollow space.

5. The dual lens structure of claim 4, wherein a second surface of the outer elongated lens segment opposite the surface of the outer elongated lens segment includes the first optical pattern and wherein the surface of the inner elongated lens segment includes the second optical pattern.

6. The dual lens structure of claim 5, wherein the first optical pattern is a first saw tooth pattern and wherein the second optical pattern is a second saw tooth pattern.

7. The dual lens structure of claim 4, wherein the surface of the outer elongated lens segment includes the first optical pattern and wherein the surface of the inner elongated lens segment includes the second optical pattern.

8. The dual lens structure of claim 7, wherein the first optical pattern is a first smooth spline shaped pattern and wherein the second optical pattern is a second smooth spline shaped pattern.

9. The dual lens structure of claim 1, wherein the dual lens structure is made from one of plastic and glass.

10. A dual lens structure, comprising:
an outer elongated lens including a first lens segment, a first flange, and a second flange, the first lens segment having a substantially dome-shaped cross-section and including a first optical pattern, wherein the first flange and the second flange extend out from opposite sides of the first lens segment; and
an inner elongated lens including a second lens segment, a third flange, and a fourth flange, the second lens segment having a substantially bell-shaped cross-section and including a second optical pattern, wherein the third flange and the fourth flange extend out from opposite sides of the second lens segment, wherein the second lens segment is at least partially positioned within the first lens segment, wherein the third flange is coupled to the first flange, and wherein the fourth flange is coupled to the second flange.

11. The dual lens structure of claim 10, wherein the first flange and the second flange extend substantially away from each other and wherein the third flange and the fourth flange extend substantially towards each other.

12. The dual lens structure of claim 10, wherein each of the outer elongated lens and the inner elongated lens is a Fresnel lens.

13. The dual lens structure of claim 10, wherein a surface of the first lens segment and a surface of the second lens segment partially surround a hollow space.

14. The dual lens structure of claim 10, wherein a first surface of the first lens segment includes the first optical pattern, wherein a surface of the second lens segment includes the second optical pattern, wherein the surface of the second lens segment faces a second surface of the first lens segment, the second surface of the first lens segment being opposite the surface of the first lens segment.

15. The dual lens structure of claim 10, wherein a surface of the first lens segment includes the first optical pattern, wherein a surface of the second lens segment includes the second optical pattern, and wherein the surface of the first lens segment faces the surface of the second lens segment.

16. The dual lens structure of claim 15, wherein the first optical pattern is a first smooth spline shaped pattern and wherein the second optical pattern is a second smooth spline shaped pattern.

17. A light fixture, comprising:
a light source; and
a dual lens structure comprising:
an outer elongated lens including a first lens segment having a substantially dome-shaped cross-section, wherein the first lens segment includes a first optical pattern;
an inner elongated lens including a second lens segment having a substantially bell-shaped cross-section, wherein the second lens segment includes a second optical pattern, wherein a portion of the second lens segment is positioned within the outer elongated lens segment, and wherein the light source is positioned in the light fixture to direct light towards the second lens segment;
a first segment coupled to and extending horizontally between a first longitudinal side of the outer elongated lens and a first longitudinal side of the inner elongated lens; and
a second segment coupled to and extending horizontally between a second longitudinal side of the outer elongated lens and a second longitudinal side of the inner elongated lens, wherein the first segment extends from the first longitudinal side of the outer elongated lens in a first direction, wherein the second segment extends from the second longitudinal side of the outer elongated lens in a second direction, wherein the first direction and the second direction are opposite directions.

18. The light fixture of claim 17, wherein a surface of the first lens segment and a surface of the second lens segment partially surround a hollow space.

19. The light fixture of claim 17, wherein a first surface of the first lens segment includes the first optical pattern, wherein a surface of the second lens segment includes the second optical pattern, wherein the surface of the second lens segment faces a second surface of the first lens segment, the second surface of the first lens segment being opposite the surface of the first lens segment.

20. The light fixture of claim 17, wherein a surface of the first lens segment includes the first optical pattern, wherein a surface of the second lens segment includes the second optical pattern, and wherein the surface of the first lens segment faces the surface of the second lens segment.

* * * * *